United States Patent
Feist (10) Patent No.: US 7,147,283 B2
(45) Date of Patent: Dec. 12, 2006

(54) TRAVEL PILLOW SHOPPING CART SEAT COVER

(76) Inventor: Mark Walton Feist, 404 W. 33rd St., Austin, TX (US) 78705

(*) Notice: Subject to any disclaimer, the term of this patent is extended or adjusted under 35 U.S.C. 154(b) by 0 days.

(21) Appl. No.: 10/994,493

(22) Filed: Nov. 22, 2004

(65) Prior Publication Data
US 2006/0119153 A1   Jun. 8, 2006

(51) Int. Cl.
   A47C 1/11   (2006.01)
(52) U.S. Cl. ............... 297/256.17; 297/219.12
(58) Field of Classification Search ........... 297/219.12, 297/256.17; 280/33.992, 33.993
   See application file for complete search history.

(56) References Cited

U.S. PATENT DOCUMENTS

| 4,655,502 A | 4/1987 | Houllis |
| 4,666,207 A | 5/1987 | Quartano |
| 4,805,937 A | 2/1989 | Boucher |
| 5,238,293 A | 8/1993 | Gibson |
| 5,330,250 A | 7/1994 | Reyes |
| 5,829,835 A | 11/1998 | Rogers |
| 5,967,606 A * | 10/1999 | Bergh et al. ........... 297/256.17 |
| 6,237,998 B1 * | 5/2001 | Aprile ................... 297/219.12 |
| 6,851,750 B1 * | 2/2005 | Sampson et al. ...... 297/256.17 |

* cited by examiner

Primary Examiner—Anthony D. Barfield
(74) Attorney, Agent, or Firm—M. A. Ervin & Associates; Michael A. Ervin (57) ABSTRACT

A compact child's travel pillow that is easily opened and unfolded into a shopping cart seat cover that provides child safety, comfort, and protection from the contaminated surfaces of shopping cart seats, then easily refolds into a compact firm travel pillow.

7 Claims, 7 Drawing Sheets

TRAVEL PILLOW SHOPPING CART SEAT COVER

TECHNICAL FIELD

The present invention relates to the childcare industry and, more particularly, to the field of child protective devices for shopping carts.

BACKGROUND

Shopping cart seat covers or liners and various other child protective devices have been developed for the seats of shopping carts. The primary function of these seat covers is to provide personal hygiene protection and added safety for a child. Numerous individuals as well as other children contact shopping cart seats and the cart handle. The seats are often soiled and can be contaminated with food as well as viruses or the bacteria associated with colds, flu or other casually transmitted diseases. The shopping cart seat cover can act as a barrier to prevent contact of the child to these contaminations. In addition these seat covers improve the comfort level of the child while sitting on the hard plastic or rigid wire components of a shopping cart seat and provide added safety, having a built in seatbelt thus eliminating the hazard posed by missing or damaged seat belts on the cart itself.

Examples of such shopping cart seat covers can be seen in U.S. Pat. No. 4,655,502 by Houllis titled "Multi-Adjustable Cushion For A Shopping Cart," U.S. Pat. No. 4,666,207 by Quartano titled "Child Shopping Cart Cushion," and U.S. Pat. No. 5,330,250 by Reyes titled "Liner For A Shopping Cart Child Seat."

Some shopping seat covers have also been developed which allow child or infant items such as bottles, rattles, or toys to be detachably connected to the seat liner or a handle of the shopping cart. Examples of such seat covers can be seen in U.S. Pat. No. 4,805,937 by Boucher et al. titled "Handler Cover And Seat Cover For Shopping Cart" and U.S. Pat. No. 5,238,293 by Gibson titled "Shopping Cart Seat Cover."

Other shopping cart seat covers have been proposed that convert between being a diaper bag and a shopping cart seat liner. An example of those can be seen in U.S. Pat. No. 5,829,835 to Rogers.

While personal hygiene improvements have occurred over the years due to the introduction of these shopping cart seat covers, they are often bulky and difficult to carry when a parent or guardian has the responsibility for also carrying or managing a small child or infant. They add to the multiplicity of child related items which a parent or guardian carries during shopping trips or the like. The complexity and awkwardness of using these conventional seat covers and their bulkiness makes these shopping cart seat covers difficult and impractical for everyday usage during shopping trips by parents or guardians of small children and creates safety hazards when trying to handle them while dealing with an active child.

The parent or guardian needs a shopping cart seat liner that provides comfort and protection to the child but can be also be compactly stored and carried when not in use and can easily be un-folded for use in a shopping cart and easily re-folded into a small and practical device that can be used when not being used as a shopping cart cover.

SUMMARY

The needs discussed are addressed by the instant invention.

One aspect of the instant invention is the creation of a combination travel pillow and shopping cart cover including at least a travel pillow exterior cover formed around an interior pillow material and joined by a first fastener comprising a first strip and a second strip that are fastened together for containing said interior pillow material and a shopping cart cover formed from said interior pillow material when said interior pillow material is removed from travel pillow exterior cover after said first fastener is unfastened, the shopping cart cover shaped to position within a shopping cart seat having a front section and a rear section; wherein the travel pillow exterior cover is integrally attached to the shopping cart cover and extends over the top of the rear section of the shopping cart seat to form a container.

Another aspect of the instant invention is that the shopping cart cover includes at least a flexible bottom section, an upstanding front wall connected to and extending upwardly from the bottom section; an upstanding rear wall connected to and extending upwardly from the bottom section; and at least one upstanding side wall connected to and extending upwardly from the bottom section wherein the upstanding front wall includes at least two leg openings formed for extending the legs of a child through them when the container is positioned in a shopping cart seat; and a seat belt connected to and extending through the upstanding rear wall for fastening to the rear section of the shopping cart seat and extending around the child.

DETAILED DESCRIPTION

Figure 1:
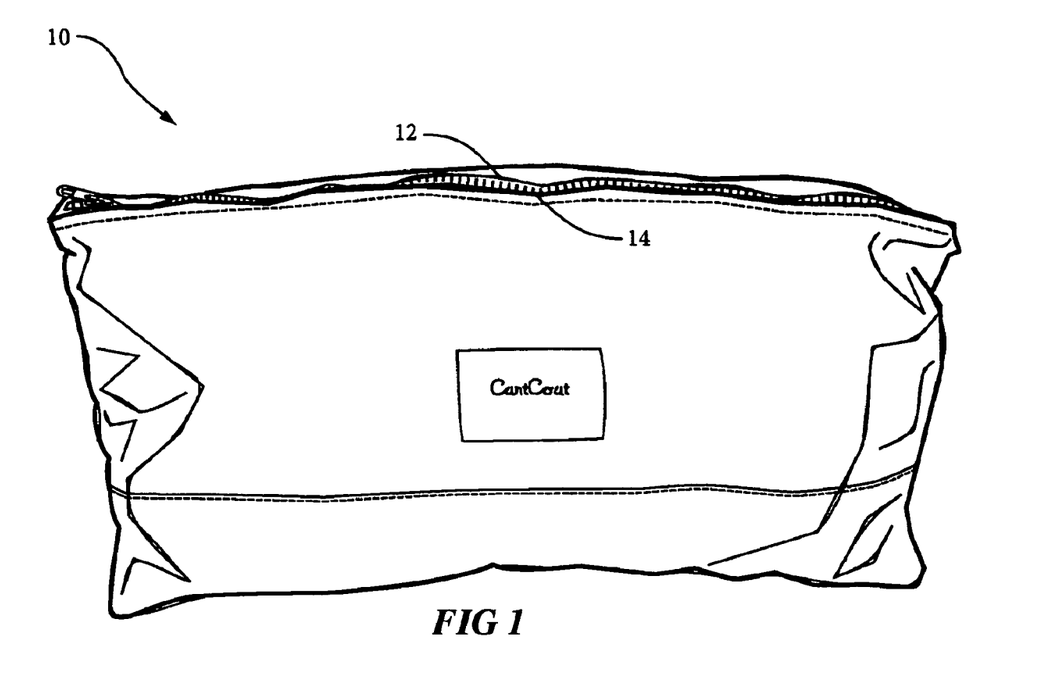
FIG. 1 is a representation of the instant invention when used as a travel pillow.

FIG. 1, represented generally by the numeral 10 is a tightly compacted, firm, lightweight travel pillow for small children. The pillow is held tightly closed by a fastener of two opposing strips 12, 14. These strips can be tightly connected as a zipper fastener, a Velcro strip fastener, buttons, or other fastening means and the instant invention anticipates any of these.

Figure 2:
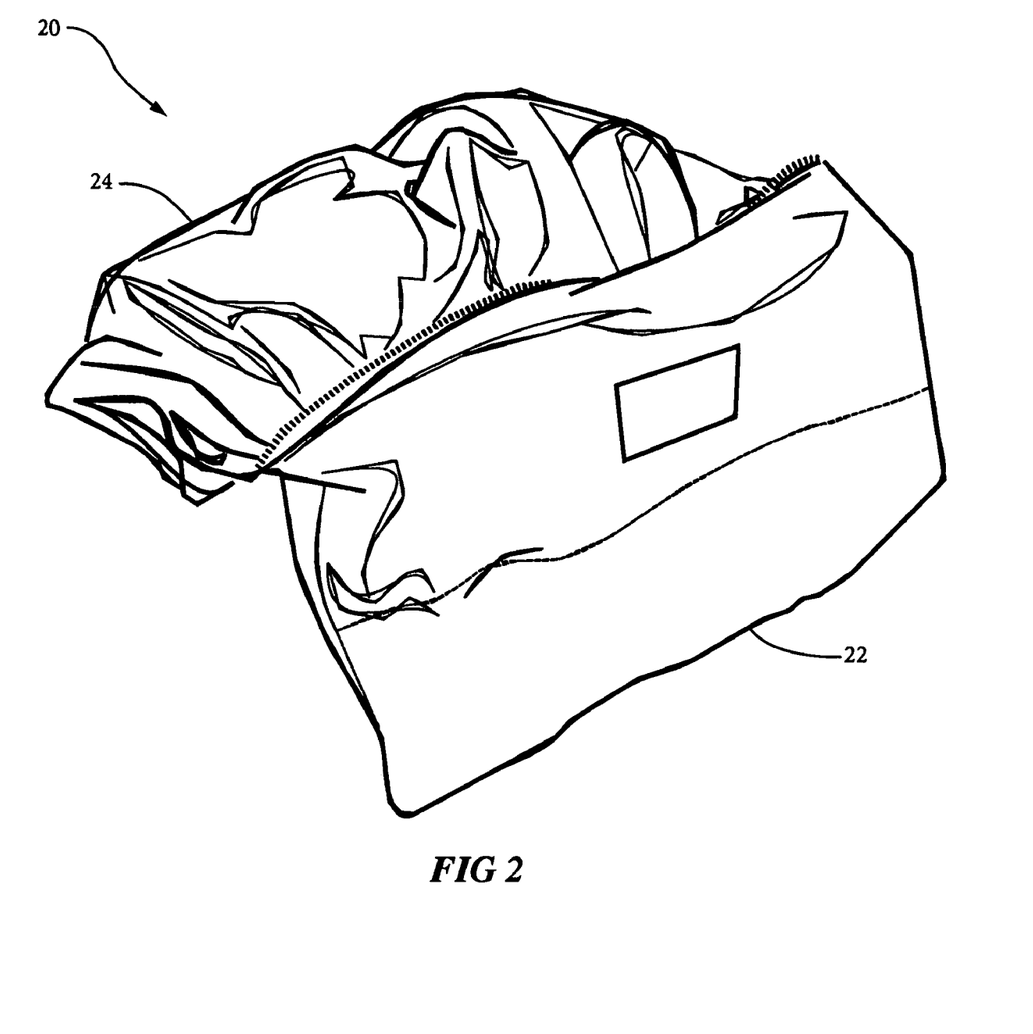
FIG. 2 is a rendering of the instant invention after the pillow has been opened and the shopping cart seat cover is partially unfurled.

FIG. 2, represented generally by the numeral 20, is a depiction of the pillow after being opened and the interior material removed and partially opened 24 for use. The travel pillow exterior cover 22, is now empty but is integrally attached to the interior material 24, which is spread out to become a shopping cart cover.

Figure 3:
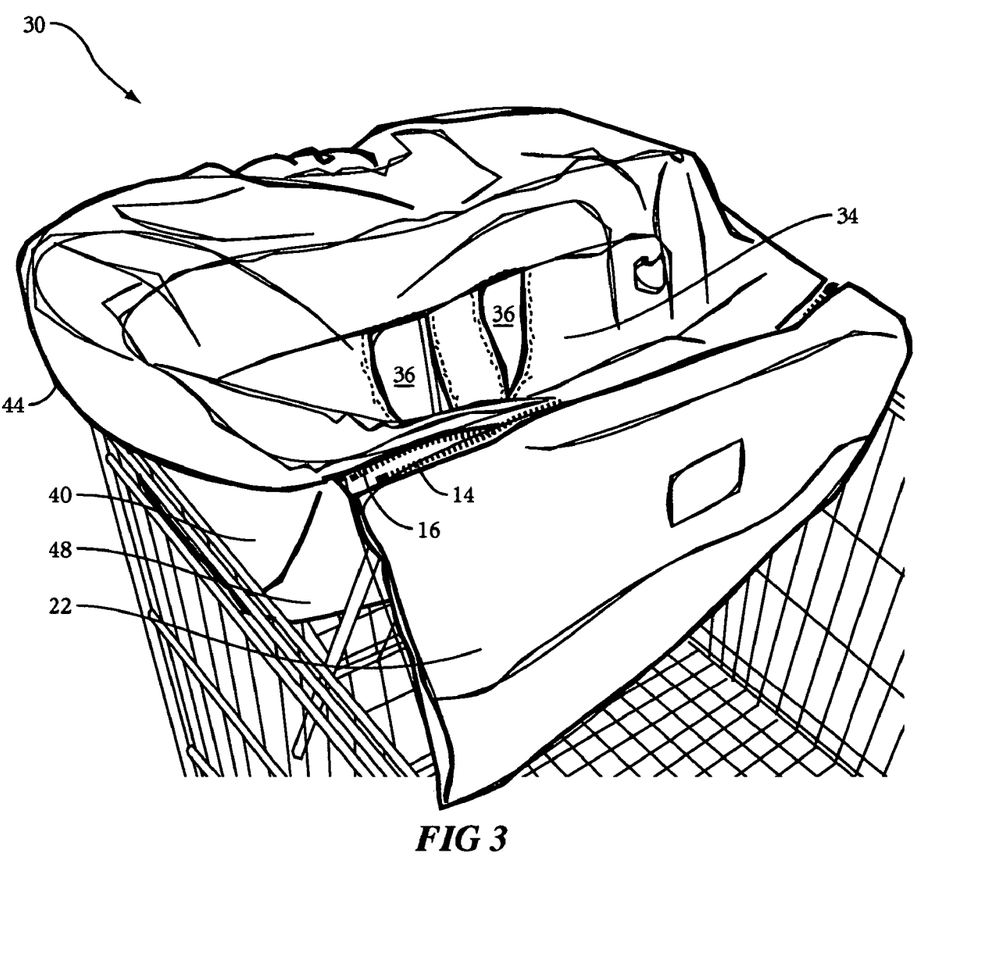
FIG. 3 is a representation of the instant invention placed in a shopping cart.

FIG. 3, represented generally by the numeral 30, is a depiction of the interior material of the pillow now placed in a shopping cart to form a shopping cart cover. A flexible shopping cart cover bottom section is placed on the bottom of the shopping cart seat. Leg holes 36 in the upstanding front wall section 34 are positioned at the front of the shopping cart seat to coincide with openings for the child's legs. An upstanding side wall section 40 is positioned along the side wall of the shopping card seat with the top 44 of the upstanding side wall draped over the shopping cart seat side wall. The upstanding rear wall section 48 is positioned against the rear wall of the shopping cart seat. The travel pillow exterior cover 22, previously used to house the interior pillow material to make a firm pillow, now is an empty container that naturally drapes over the rear wall to be used for temporary storage of objects during the use of the shopping cart. Fastener strip 14 is the same as fastener strip 14 shown in FIG. 1. Fastener strip 16 is not the same as fastener strip 12 in FIG. 1. It represents a third fastener strip that is initially part of the interior material stored within the travel pillow exterior cover when it is configured as a travel pillow. This third fastener strip 16 lies along and is part of the seam that connects the interior material (shopping cart seat cover) with travel pillow exterior cover 22. After the interior material is removed to create a shopping cart seat cover then fastener strip 16 aligns with the first fastener strip 14 and can be used to close the seal the empty travel pillow exterior cover. This use of three different fastener strips is an aspect of the invention. The travel pillow exterior cover 22 is an integral piece of the complete travel pillow shopping cart seat cover and remains attached at all times along the seam of fastener strip 16.

Figure 4:
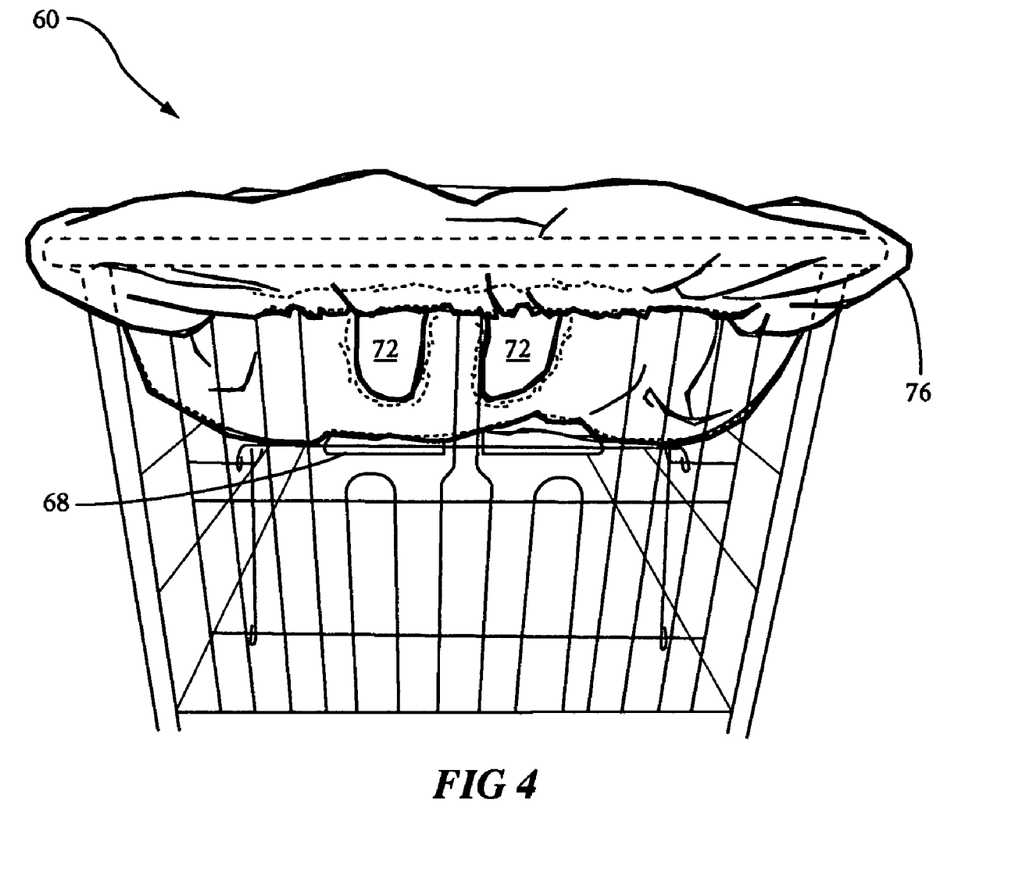
FIG. 4 is a representation of the instant invention from the front showing the placement of the infant leg holes.

FIG. 4, represented generally by the numeral 60, is a front view of the shopping cart seat cover placed in the shopping cart and on the bottom 68 of the shopping cart seat. The shopping cart seat cover is shown positioned so that leg holes 72 correspond to the leg holes of the shopping cart seat. The top part 76 of shopping cart seat cover is positioned to completely cover the top edges of shopping cart and thereby protect the child from exposure to germs, viruses, contaminated food leavings etc., from previous users of the cart.

Figure 5:
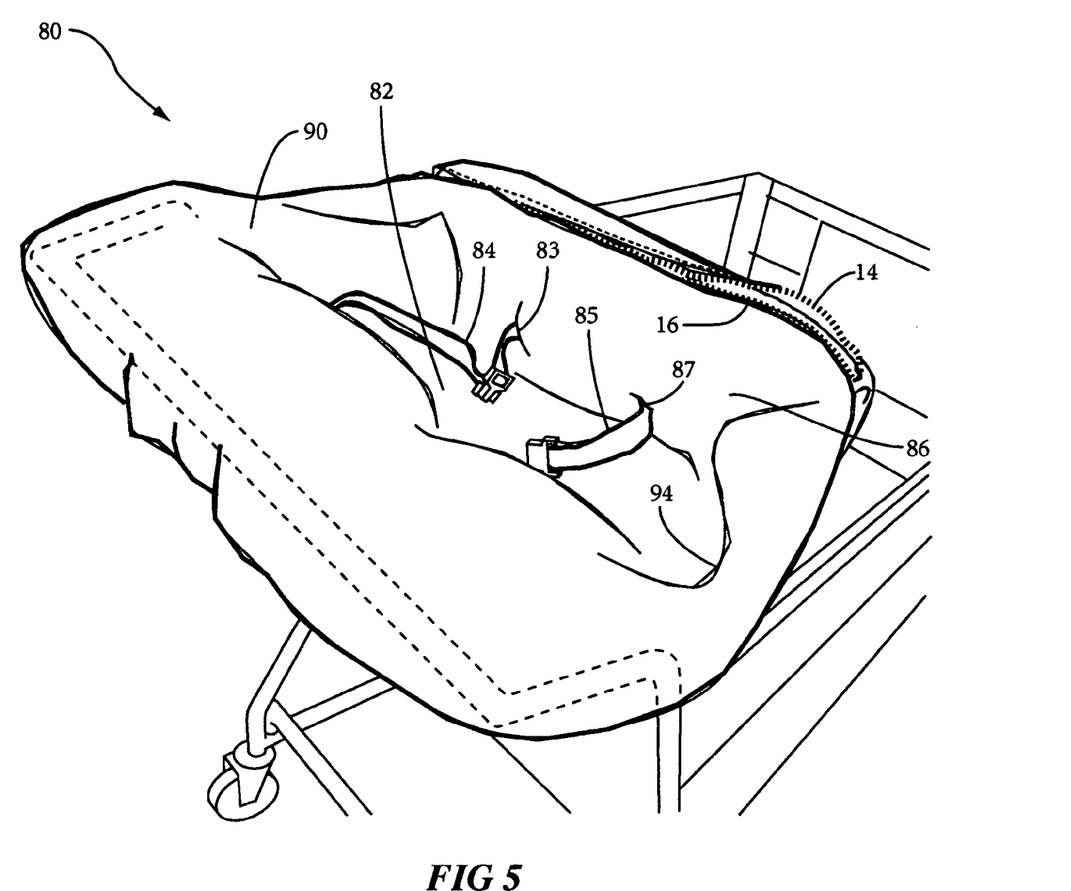
FIG. 5 is a representation of the instant invention showing the attached seat belt.

FIG. 5, represented generally by the numeral 80, is a view from above and looking at the back interior section of the shopping cart seat cover. An attached seat belt 84, 85 that can be placed around the child after the child is placed in the shopping cart cover is connected to and passes through the upstanding rear wall section 86 of the shopping cart seat cover, which is positioned against the rear wall of the shopping cart. One strap 85 is fixably connected at point 87. The second strap 84 is connected to the exterior of back wall 86 at point 87. It is passed behind back wall 86, around some of the rear rails of the shopping cart seat, and re-enters thru hole 83 to pass around the child and be connected to strap 85. This provides a more secure seat belt support for the child. A bottom section 82 of the shopping cart seat cover is placed directly onto the bottom of the shopping cart seat. Upstanding side wall sections 90,94 of the shopping cart seat cover are positioned against the inside walls of the shopping cart seat. Two fastener strips 14,16 can be seen in the opening of the travel pillow exterior cover that is deployed to hang over the rear wall of the shopping cart seat. Fastener strip 14 is the same as fastener strip 14 of FIG. 1. Fastener strip 16 is not the same as fastener strip 12 in FIG. 1. It represents a third fastener strip that is initially located within the travel pillow exterior cover when it is configured as a travel pillow. Upon opening the travel pillow the internal shopping cart seat cover, which is integrally attached to this third fastener strip 16 aligns with first fastener strip 14 and can be used to close the seal the empty travel pillow exterior cover. This use of three different strips is an aspect of the invention.

Figure 6:
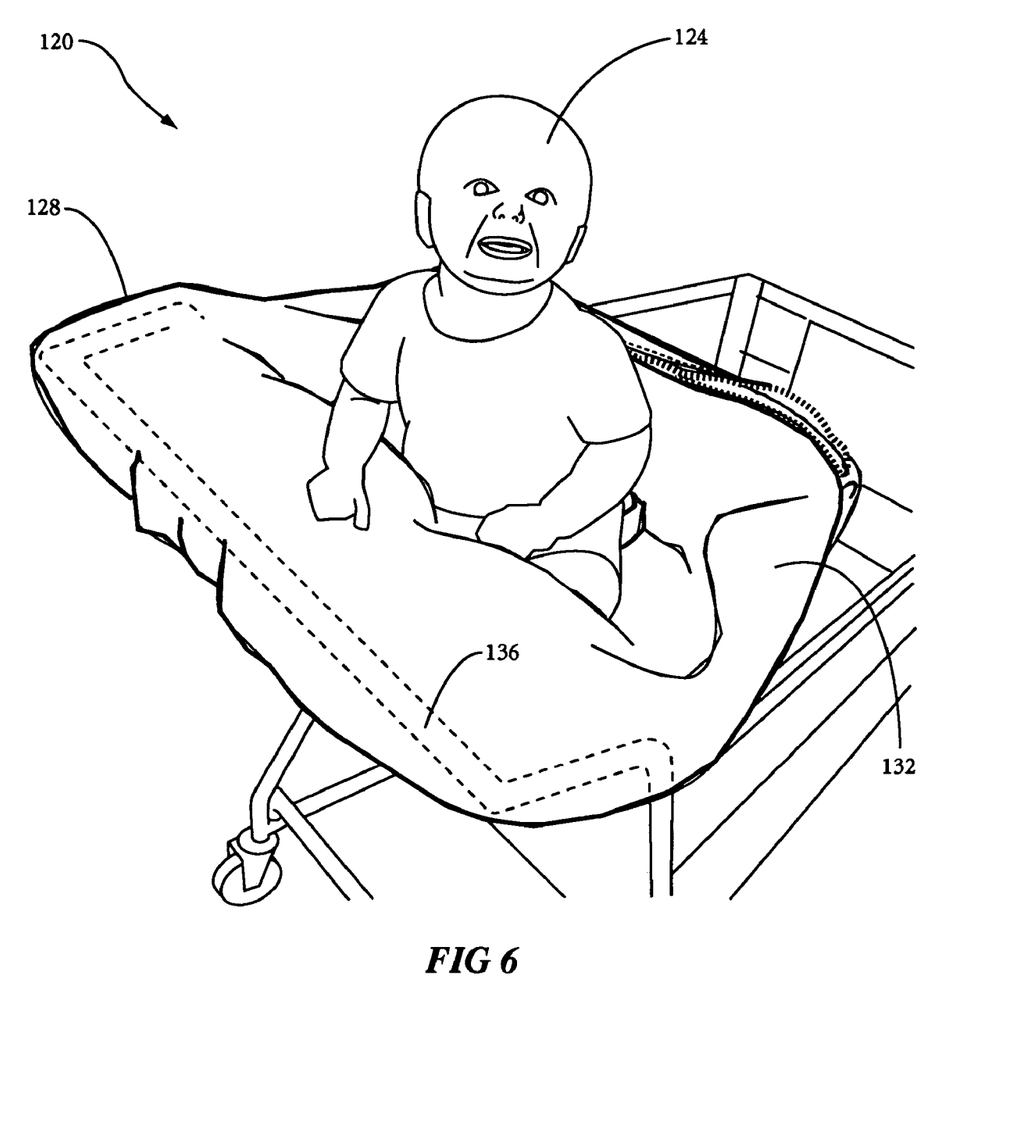
FIG. 6 is a representation of the invention with an infant placed in it.

FIG. 6, represented generally by the numeral 120, is a representation of a child 124 using the shopping cart seat cover of the instant invention. Top section 128 of shopping cart seat cover 132 is positioned over front rail 136 of shopping cart seat, protecting the child from exposure to germs, viruses, contaminated food leavings etc., from previous users of the cart.

Figure 7:
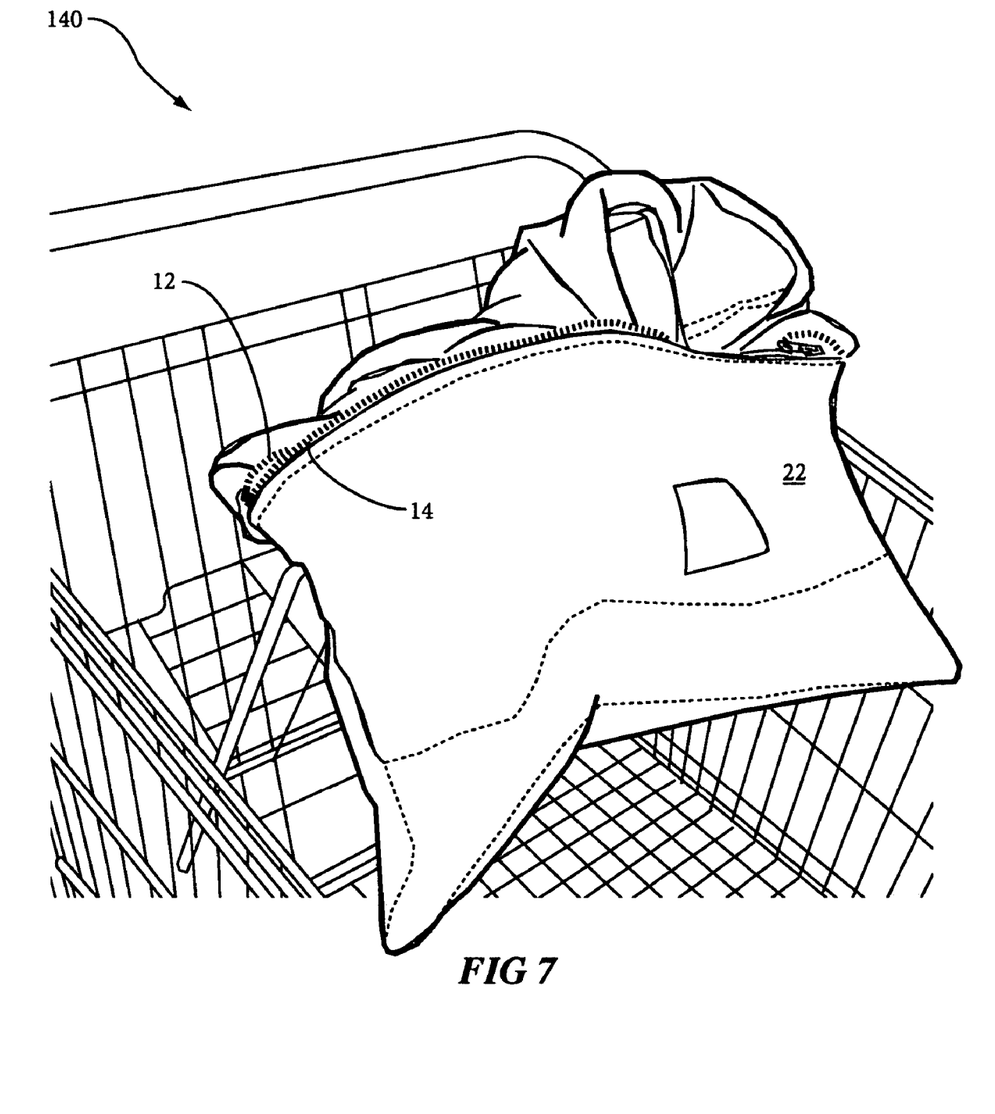
FIG. 7 is a rendering of the instant invention showing the pillow being refolded back into a travel pillow.

FIG. 7, represented generally by the numeral 140, is a representation of the shopping cart seat cover being packed back into the travel pillow exterior cover 22 and again becoming the interior material that forms the shape of the firm travel pillow. As the shopping cart seat cover is completely packed back into the travel pillow exterior cover fastener strip 16 of FIG. 5 is packed inside the travel pillow exterior cover and upon completing the packing the original fastener strip 12 of FIG. 1 returns to the position in alignment with fastener strip 14 of FIG. 7. The fastener strips can then be closed, forming once again a firm travel pillow.

The resulting combination results in a shopping cart seat cover that can be compactly stored and carried when not in use and can easily be un-folded for use in a shopping cart and easily re-folded into a small and practical device, namely a firm travel pillow, that can be used when not being used as a shopping cart seat cover. This makes it compact, self contained, and very manageable. The same pocket that creates the pillow is also a zippered pocket when the shopping cart seat cover is in use.

The invention claimed is:

1. A pillow and shopping cart cover in combination with a shopping cart comprising:
   a. a travel pillow exterior cover formed around an interior pillow material and joined by a first fastener comprising a first strip and a second strip that are fastened together for containing said interior pillow material; and
   b. a shopping cart cover formed from said interior pillow material when said interior pillow material is removed from travel pillow exterior cover after said first fastener is unfastened, said shopping cart cover shaped to position within a shopping cart seat for seating a child, said shopping cart seat positioned at the rear of a shopping cart so that said child is facing rearward of the shopping cart, said shopping cart seat having a front wall section in front of said child at the rear of said shopping cart and said shopping cart seat having a rear wall section behind said child;
   c. wherein said travel pillow exterior cover is integrally attached to said shopping cart cover and extends over the top of said rear wall section of said shopping cart seat to form a container.

2. The travel pillow and shopping cart cover in combination with a shopping cart of claim 1 wherein said first fastener is a zipper.

3. The travel pillow and shopping cart cover in combination with a shopping cart of claim 1 wherein said first fastener is a Velcro fastener.

4. The travel pillow and shopping cart cover of claim 1 wherein said first fastener is a button fastener wherein said first strip comprises buttonholes and said second strip comprises buttons.

5. The travel pillow and shopping cart cover in combination with a shopping cart of claim 1 wherein said shopping cart cover comprises:
   a. a flexible bottom section;
   b. an upstanding front wall section connected to and extending upwardly from said bottom section;
   c. an upstanding rear wall section connected to and extending upwardly from said bottom section;
   d. at least one upstanding side wall section connected to and extending upwardly from said bottom section;
   e. wherein said upstanding front wall section comprises two leg openings formed therein for extending the legs of a child therethrough when said container is positioned in a shopping cart seat;
   f. a seat belt connected to and extending through said upstanding rear wall section for fastening to said rear wall section of said shopping cart seat and extending around said child;
   g. wherein said travel pillow exterior cover is integrally attached to said shopping cart cover and extends over the top of said rear wall section of said shopping cart seat to form a container.

6. The travel pillow and shopping cart cover in combination with a shopping cart of claim 1 further comprising a second fastener comprising said first strip and a third strip that can be fastened to close said travel pillow exterior cover after said interior pillow material is removed.

7. The travel pillow and shopping cart cover in combination with a shopping cart of claim 6 wherein said shopping cart cover is integrally attached to said third strip.

* * * * *